United States Patent
Kinto

(10) Patent No.: US 12,050,132 B2
(45) Date of Patent: Jul. 30, 2024

(54) COLORIMETRY DEVICE

(71) Applicant: Konica Minolta, Inc., Tokyo (JP)

(72) Inventor: Yasuhisa Kinto, Neyagawa (JP)

(73) Assignee: KONICA MINOLTA, INC., Tokyo (JP)

( * ) Notice: Subject to any disclaimer, the term of this patent is extended or adjusted under 35 U.S.C. 154(b) by 274 days.

(21) Appl. No.: 17/753,463

(22) PCT Filed: Aug. 28, 2020

(86) PCT No.: PCT/JP2020/032573
§ 371 (c)(1),
(2) Date: Mar. 3, 2022

(87) PCT Pub. No.: WO2021/049325
PCT Pub. Date: Mar. 18, 2021

(65) Prior Publication Data
US 2022/0316948 A1    Oct. 6, 2022

(30) Foreign Application Priority Data

Sep. 12, 2019   (JP) ................................. 2019-166400

(51) Int. Cl.
*G01J 3/02* (2006.01)
*G01J 3/50* (2006.01)
(52) U.S. Cl.
CPC ............... *G01J 3/50* (2013.01); *G01J 3/0248* (2013.01); *G01J 3/0251* (2013.01)
(58) Field of Classification Search
CPC .......... G01J 3/50; G01J 3/0248; G01J 3/0251; G01J 3/46
(Continued)

(56) References Cited

U.S. PATENT DOCUMENTS 5,369,481 A * 11/1994 Berg ...................... G01N 21/55
356/319
6,226,085 B1 * 5/2001 Weber .................. G01N 21/474
356/600

FOREIGN PATENT DOCUMENTS

CN    203414172 U    1/2014
JP    S56-103830 U   8/1981
(Continued)

OTHER PUBLICATIONS

Office Action dated Sep. 20, 2023, for the corresponding Chinese Application No. 202080062971.2, with English translation.
(Continued)

*Primary Examiner* — Jamares Q Washington
(74) *Attorney, Agent, or Firm* — LUCAS & MERCANTI, LLP

(57) ABSTRACT

A colorimetry device includes an integrating sphere having a measurement opening part and a trap hole, a trap disposed to be able to open and close the trap hole, a lid that is non-reflective and disposed to be able to open and close the trap hole, an imaging means disposed at a position that allows taking, through the trap hole, an image of a specimen facing the measurement opening part, and a display means that displays an image taken by the imaging means. The trap is to move to a position at which the trap hole is closed by the trap at a time of measurement of light with an SCI method, the light being reflected from the specimen, and the lid is moved to a position at which the trap hole is closed by the lid at a time of measurement of the light with an SCE method.

5 Claims, 9 Drawing Sheets

(58) Field of Classification Search
USPC .................................. 356/940, 402, 236, 319
See application file for complete search history.

(56) References Cited

FOREIGN PATENT DOCUMENTS

| JP | S63-10509 A | 1/1988 |
| JP | S63-10509 U | 1/1988 |
| JP | 2003-232683 A | 8/2003 |
| JP | 2007-515640 A | 6/2007 |

OTHER PUBLICATIONS

PCT, International Search Report for the corresponding application No. PCT/JP2020/032573, dated Oct. 13, 2020, with English translation.
PCT, Written Opinion for the corresponding application No. PCT/JP2020/032573, dated Oct. 13, 2020, with English translation.
Office Action issued on Aug. 22, 2023 for the corresponding Japanese Application No. 2021-545214, with English translation.
Office Action dated Mar. 24, 2023 for the corresponding Chinese application No. 202080062971.2, with English translation.

* cited by examiner

MEASUREMENT BUTTON PRESSED

MEASUREMENT BUTTON PRESSED

MEASUREMENT BUTTON PRESSED

MEASUREMENT BUTTON PRESSED

MEASUREMENT BUTTON PRESSED

COLORIMETRY DEVICE

CROSS REFERENCE TO RELATED APPLICATION

This Application is a 371 of PCT/JP2020/032573 filed on Aug. 28, 2020 which, in turn, claimed the priority of Japanese Patent Application No. 2019-166400 filed on Sep. 12, 2019, and both applications are incorporated herein by reference.

TECHNICAL FIELD

The present invention relates to a colorimetry device that uses an integrating sphere and is capable of performing reflected light measurement under a condition where specular reflection light from a specimen is included (Specular Component Included (SCI) and reflected light measurement under a condition where specular reflection light is excluded (Specular Component Excluded (SCE) by switching therebetween.

Note that, in the following description, the reflected light measurement under the condition where specular reflection light from a specimen is included (SCI) is also referred to as SCI measurement, and the reflected light measurement under the condition where specular reflection light is excluded (SCE) is also referred to as SCE measurement.

BACKGROUND ART

In recent years, while demand for accuracy in color management of industrial products has been increasing, many micro-components having complex shapes have been produced. Especially in a case of a handheld colorimetry device, when a user holds the colorimetry device in one hand and a specimen as a measurement target in another other hand for measurement, accurate measurement cannot be performed unless a measurement opening part is applied properly to a predetermined position of a micro-component. Therefore, there may be a case where work time is wasted on operation for determining the position or redoing due to measurement failure.

Therefore, it is conceivable that, in a case of a colorimetry device using an integrating sphere, a hole for connecting a camera is made in the integrating sphere beforehand, and a position of the specimen is checked with an image taken by the camera, or the like.

However, in a case of a compact colorimetry device, a size of the integrating sphere is small, and therefore, making another hole separately for connection to the camera causes significant deterioration in mixing performance and is not preferable.

Note that Patent Literature 1 discloses a benchtop spectrophotometer in which a camera is disposed such that light reflected from a specimen passes through a beam splitter and is sent to both the camera and a sample spectrometer, by which a position of the specimen can be checked by the camera in real time.

In addition, Patent Literature 2 discloses a spectrophotometer including a digital camera configured to measure light component from a sample.

CITATION LIST

Patent Literature

Patent Literature 1: JP 2003-232683 A
Patent Literature 2: JP 2007-515640 A

SUMMARY OF INVENTION

Technical Problem

However, Patent Literature 1 does not describe switching between SCI measurement and SCE measurement, and requires a beam splitter for sending the light reflected from the specimen to both the camera and the sample spectrometer, resulting in a complex structure.

In addition, the digital camera in Patent Literature 2 is for measurement of a specular reflection component, and it is not described that the digital camera is used for checking of a position of a specimen by a user, or the like.

The present invention has been made in view of such technical backgrounds, and an object thereof is to provide a colorimetry device that uses an integrating sphere and can perform SCI measurement and SCE measurement by switching therebetween, and that allows, with a simple configuration, a user to check a position of a specimen, or the like.

Solution to Problem

The above object is achieved by the following means.

(1) A colorimetry device including an integrating sphere having a measurement opening part and a trap hole, a trap disposed so as to be able to open and close the trap hole, a lid that is non-reflective and disposed so as to be able to open and close the trap hole, an imaging means disposed at a position that allows taking, through the trap hole, an image of a specimen facing the measurement opening part, a display means that displays an image taken by the imaging means, a first drive means that causes the trap to move to a position at which the trap hole is closed by the trap at a time of measurement of light with an SCI method, the light being reflected from the specimen, and a second drive means that causes the lid to move to a position at which the trap hole is closed by the lid at a time of measurement of light with an SCE method, the light being reflected from the specimen.

(2) The colorimetry device according to the preceding paragraph 1, in which the first drive means and the second drive means are included in one drive means.

(3) A colorimetry device including an integrating sphere having a measurement opening part and a trap hole, a trap disposed so as to be able to open and close the trap hole, an imaging means disposed at a position that allows taking, through the trap hole, an image of a specimen facing the measurement opening part, a display means that displays an image taken by the imaging means, a first drive means that causes the trap to move to a position at which the trap hole is closed by the trap at a time of measurement of light with an SCI method, the light being reflected from the specimen, and a third drive means that retracts the imaging means to a position that does not affect measurement at a time of measurement of light with an SCE method, the light being reflected from the specimen.

Advantageous Effects of Invention

According to the invention described in the preceding paragraph (1), the imaging means is disposed at a position that allows taking, through the trap hole, an image of the specimen facing the measurement opening part, and a taken image is displayed on the display means, and therefore, a user can align the specimen with the measurement opening part while checking a position of the specimen by viewing the display means. Thus, positioning with respect to the specimen can be performed quickly and easily, and therefore, it is possible to obtain an appropriate measurement result while improving efficiency of measurement work. Moreover, because a beam splitter for splitting light, which is reflected from the specimen, for the camera is not required, and therefore, the present invention can be implemented with a simple configuration.

In addition, because the trap moves and the trap hole is closed when measurement of light reflected from the specimen is performed with the SCI method, the SCI measurement can be performed appropriately. Meanwhile, because the lid that is non-reflective moves and the trap hole is closed at a time of measurement with the SCE method, an effect of disposing the imaging means can be prevented, the effect being on measurement. As a result, measurement can be performed by switching between the SCI method and the SCE method without any problem.

According to the invention described in the preceding paragraph (2), the trap and the lid can be moved by one drive means, and therefore, space for installation of the drive means can be reduced as compared to a case where separate drive means are included.

According to the invention described in the preceding paragraph (3), the imaging means is disposed at a position that allows taking, through the trap hole, an image of the specimen facing the measurement opening part, and a taken image is displayed on the display means, and therefore, the user can align the specimen with the measurement opening part while checking a position of the specimen by viewing the display means. Thus, positioning with respect to the specimen can be performed quickly and easily, and therefore, with a simple configuration, it is possible to obtain an appropriate measurement result while improving efficiency of measurement work.

In addition, the trap moves to close the trap hole at a time of measurement of light with the SCI method, the light being reflected from the specimen, and the imaging means is retracted to a position that does not affect measurement at a time of measurement with the SCE method, and therefore, an effect of disposing the imaging means can be prevented, the effect being on measurement, and measurement can be performed by switching between the SCI method and the SCE method without any problem.

DESCRIPTION OF EMBODIMENTS

Hereinafter, an embodiment according to the present invention will be described with reference to the drawings.

Figure 1:
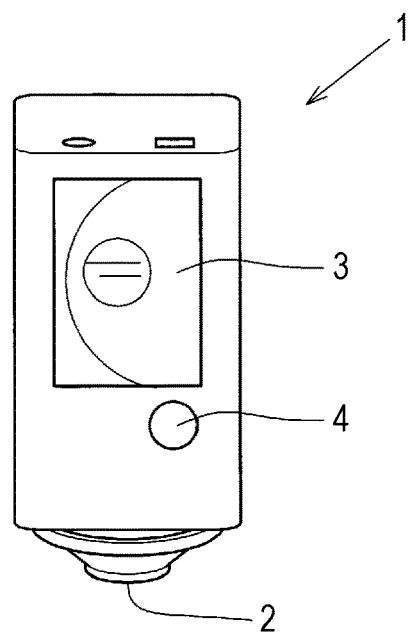
FIG. 1 is an external view of a colorimetry device according to one embodiment of the present invention.

FIG. 1 is an external view of a handheld colorimetry device 1 according to one embodiment of the present invention. The colorimetry device 1 has a measurement opening part 2 at a bottom end part thereof, a display panel 3 including a liquid crystal or the like at an upper part of a front surface thereof, and a measurement button 4 below the display panel 3.

The measurement opening part 2 is a portion for aligning a bottom end opening thereof with a specimen 100 to be measured. The display panel 3 displays a result of measurement by the colorimetry device 1 or an image obtained by taking an image of the specimen 100 in the measurement opening part 2 by a camera described later. The measurement button 4 is an operation button that a user presses when starting measurement.

Figure 2:
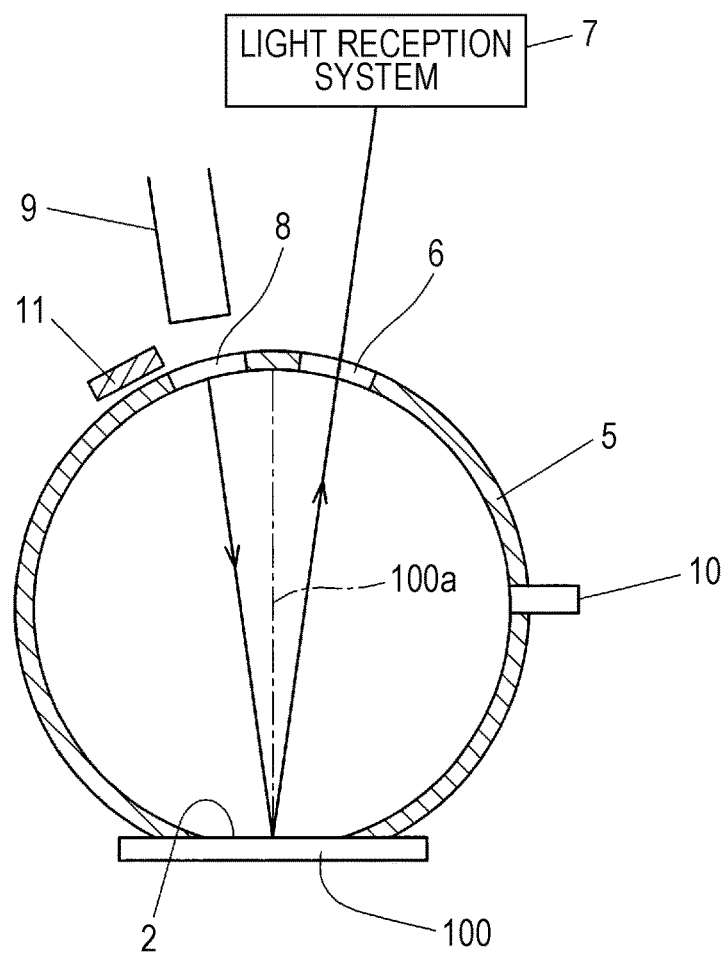
FIG. 2 is a diagram that schematically illustrates a configuration of an integrating sphere and peripheral parts thereof.

An integrating sphere is provided inside the colorimetry device 1. FIG. 2 is a diagram that schematically illustrates a configuration of an integrating sphere 5 and peripheral parts thereof.

The measurement opening part 2 described above is formed at a bottom end part of the integrating sphere 5, a light reception opening 6 is formed at an upper part of the integrating sphere 5 and at a position 8 degrees with respect to a normal line 100a of the specimen 100 disposed at the measurement opening part 2, and a light reception system 7 is disposed on a straight line connecting the specimen 100 and the light reception opening 6.

Further, the integrating sphere 5 is formed with a trap hole 8 having a circular shape at a position symmetrical to the light reception opening 6 with respect to the specimen 100. On an outside of the integrating sphere 5, a camera 9 as an imaging means is disposed on a straight line connecting the specimen 100 and the trap hole 8, by which an image of the specimen 100 can be taken through the trap hole 8 by the camera 9 at a time of colorimetry, and a taken image can be displayed on the display panel 3 via an unillustrated control unit.

The light reception system 7 receives, from the specimen 100, reflected light of diffusion light emitted from a light source 10 and diffused in the integrating sphere 5, the light source 10 being provided on the integrating sphere 5. A result of the light reception is calculated by the unillustrated control unit, and colorimetry is performed. A result of the colorimetry is displayed on the display panel 3.

In this embodiment, SCI measurement and SCE measurement can be performed by switching therebetween. Because the SCI measurement is measurement in which specular reflection light is included, it is necessary to close the trap hole 8. Therefore, a trap 11 for closing the trap hole 8 is provided. Meanwhile, because the SCI measurement is measurement in which specular reflection light is excluded, it is not necessary to close the trap hole 8 with the trap 11. Therefore, the trap 11 is necessary to be displaced between a closed state and open state of the trap hole 8.

However, if the SCE measurement is performed with the trap hole 8 open, specular reflection light may be generated due to reflection from the camera, and accurate SCE measurement cannot be performed.

Therefore, in this embodiment, the following configurations are used so that accurate SCE measurement can be performed, and switching between SCI measurement and SCE measurement is ensured.

[First Configuration]

Figure 3:
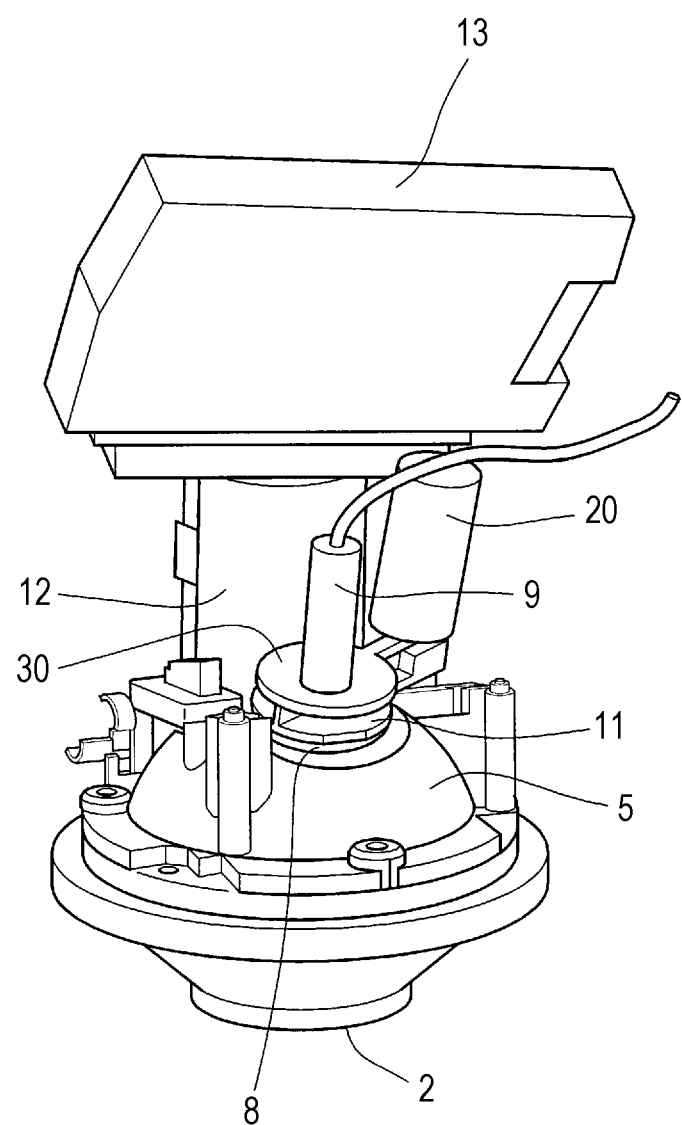
FIG. 3 is a perspective view that illustrates a first configuration example of an inside of the colorimetry device.

FIG. 3 is a perspective view that illustrates an internal configuration of the colorimetry device 1. In addition to the measurement opening part 2, integrating sphere 5, and camera 9 described above, a body tube 12 and a sensor substrate 13 are provided inside the colorimetry device 1. A sensor (not illustrated) that receives measurement light from the specimen 100 is mounted on the sensor substrate 13, and the body tube 12 guides measurement light to the sensor. The light reception system 7 includes the body tube 12, the sensor substrate 13, and the sensor.

Figure 4:
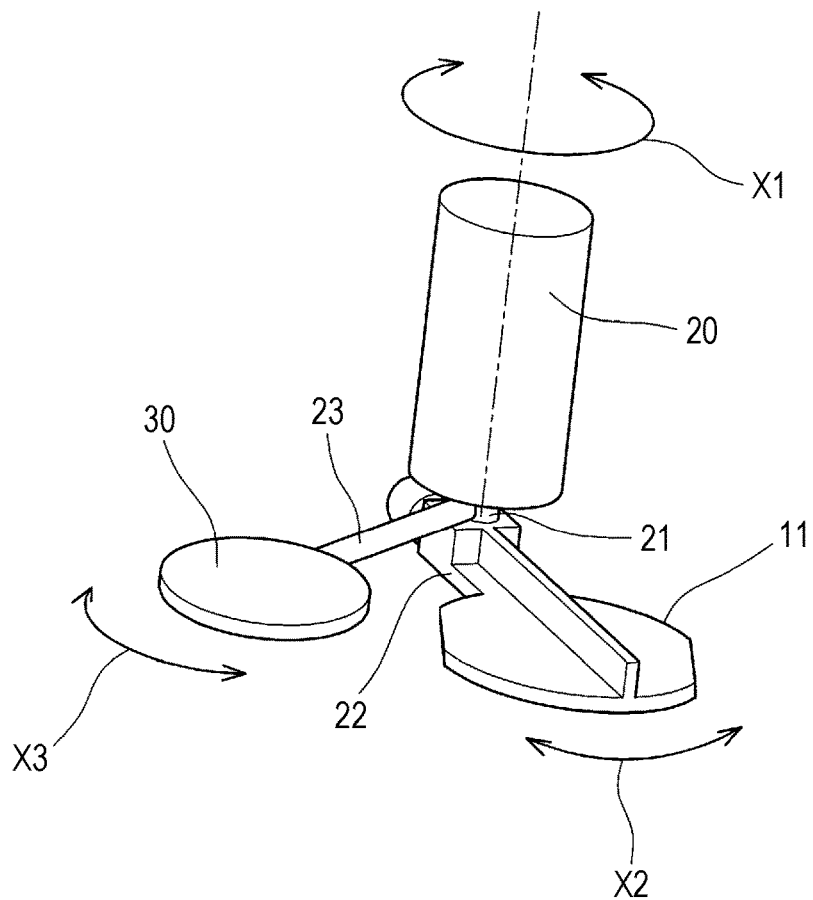
FIG. 4 is a diagram for describing how a trap and a lid are coupled to a drive solenoid and driven in the first configuration example.

As illustrated in FIG. 4, the trap 11 that opens and closes the trap hole 8 of the integrating sphere 5 is formed in a shape that enables closing of the trap hole 8, and is coupled to a rotary shaft 21 of a drive solenoid (corresponding to a drive means) 20 via a coupling arm 22 extending in a radial direction.

Therefore, when the rotary shaft 21 of the drive solenoid 20 is rotated in a clockwise direction and a counterclockwise direction as viewed from above as indicated by the arrow x1 in FIG. 4, the trap 11 also turns in the clockwise direction and the counterclockwise direction via the coupling arm 22 as indicated by the arrow x2 in FIG. 4. Then, when turning in the clockwise direction, the trap 11 moves to a position between the trap hole 8 and the camera 9 to close the trap hole 8, and when turned in the counterclockwise direction, the trap 11 moves in a direction away from the trap hole 8 to open the trap hole 8.

Further, a lid 30 is coupled to the rotary shaft 21 of the drive solenoid 20 via a coupling arm 23, and when the rotary shaft 21 of the drive solenoid 20 is rotated in an x1 direction, the lid also turns via the coupling arm 23 in the clockwise direction and the counterclockwise direction as viewed from above as indicated by the arrow x3 in FIG. 4. Then, when turning in the clockwise direction, the lid 30 moves to a position between the trap hole 8 and the camera 9 to close the trap hole 8, and when turned in the counterclockwise direction, the lid 30 moves in a direction away to open the trap hole 8.

The trap 11 and the lid 30 are displaced from each other in a thickness direction at a position coupled with the rotary shaft 21 of the drive solenoid 20, and therefore the trap 11 and the lid 30 can turn independently of each other even if the rotary shaft 21 of the drive solenoid 20 rotates. A mechanism that enables the trap 11 and the lid 30 to turn independently of each other even if the rotary shaft 21 of the drive solenoid 20 rotates may be implemented by, but not limited to, a configuration in which the rotary shaft 21 is movable in a length direction, and the rotary shaft 21 is coupled with the trap 11 and uncoupled from the lid 30 when not moving in the length direction, and the rotary shaft 21 is uncoupled from the trap 11 and is coupled with the lid 30 when moving in the length direction. Alternatively, turning of the lid 30 may be prevented by an unillustrated stopper when the trap 11 is desired to be turned, and turning of the trap 11 may be prevented by the stopper when the lid 30 is desired to be turned. Alternatively, the lid 30 on an upper side may overlap and turn with the trap 11 on a lower side to close the trap hole 8 when the trap 11 is turned, and only the lid 30 may turn and the trap 11 may not turn when the lid 30 is turned. FIG. 3 also illustrates a state where the lid 30 overlaps the trap 11 on the lower side, by which the trap hole 8 is closed.

The lid 30 enters between the trap hole 8 and the camera 9 at a time of SCE measurement to close the trap hole 8 to prevent generation of specular reflection light on the specimen 100 due to reflection from the camera 9, and has a non-reflective surface characteristic, such as a black surface, for example.

Next, operation of the colorimetry device 1 illustrated in FIGS. 3 and 4 will be described with reference to FIGS. 5 and 6.

Figure 5A:
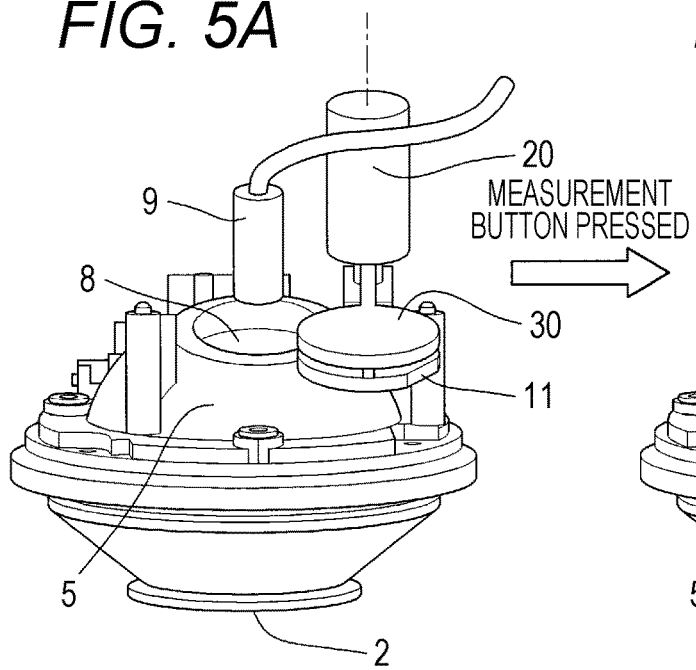
FIG. 5A and FIG. 5B are an explanatory diagram at a time of SCI measurement in the first configuration example.

In a state where an unillustrated power switch is turned on by the user, the trap hole 8 is open, and the camera 9 can take an image of the specimen 100 through the trap hole 8 as illustrated in FIG. 5A.

In a case where SCI measurement is performed, when the user sets an SCI measurement mode, holds the colorimetry device 1, and then aligns the measurement opening part 2 with the specimen 100 as a measurement target, an image of the specimen 100 taken by the camera 9 is displayed on the display panel 3. The user performs alignment of the specimen 100 while checking the image on the display panel 3.

Figure 5B:
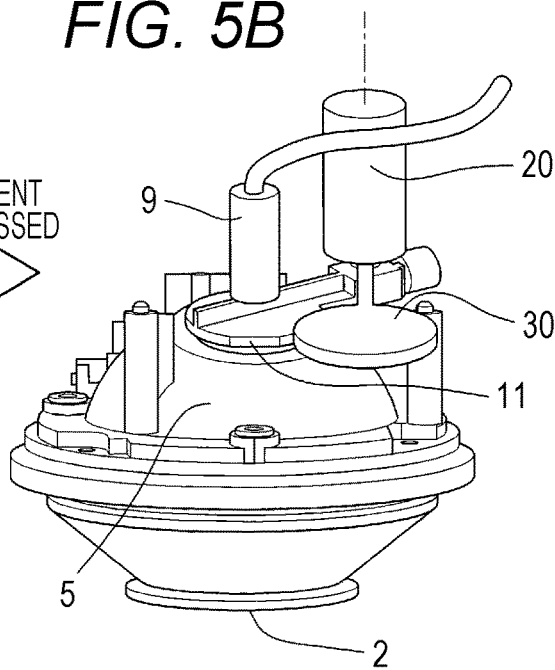

When the user presses the measurement button 4 after the alignment, the drive solenoid 20 operates, the rotary shaft 21 rotates and the trap 11 turns, and then the trap hole 8 is closed by the trap 11 as illustrated in FIG. 5B. Then, the SCI measurement is performed in this state. Because the trap hole 8 is closed by the trap 11, appropriate SCI measurement in which specular reflection light is included can be performed.

Figure 6A:
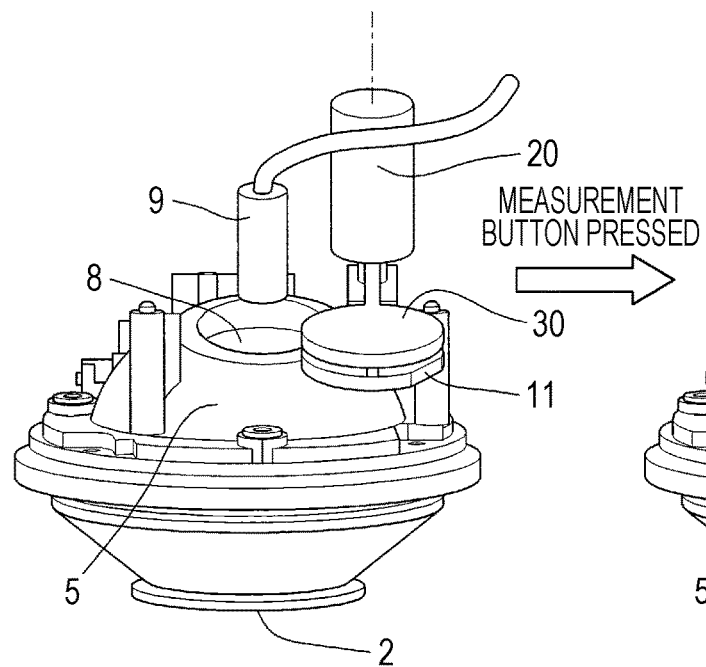
FIG. 6A and FIG. 6B are an explanatory diagram at a time of SCE measurement in the first configuration example.

When the SCI measurement ends, the rotary shaft 21 of the drive solenoid 20 rotates in an opposite direction, and the trap 11 turns in the opposite direction, by which the trap hole 8 is open as illustrated in FIG. 6A (same as in FIG. 5A).

Meanwhile, in a case where the user performs SCE measurement, when the user sets an SCE measurement mode, and then aligns the measurement opening part 2 with the specimen 100 as the measurement target, an image of the specimen 100 taken by the camera 9 is displayed on the display panel 3, similarly to a case of the SCI measurement, and therefore, the user performs alignment of the specimen 100 while checking the image on the display panel 3.

Figure 6B:
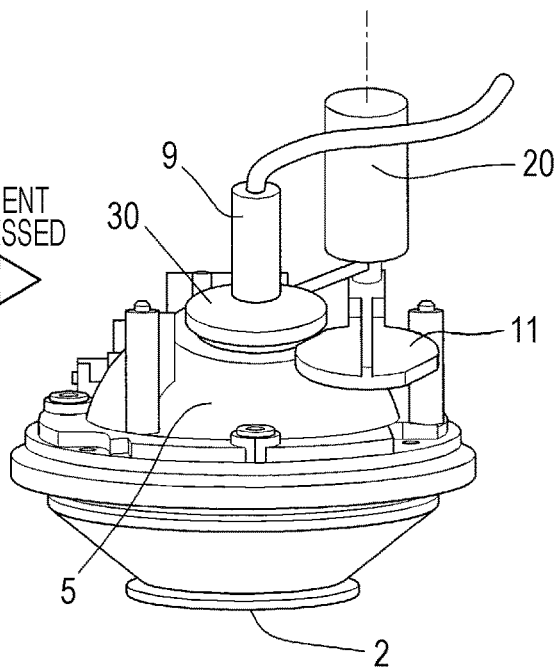

When the user presses the measurement button 4 after the alignment, the drive solenoid 20 operates, and the rotary shaft 21 rotates as illustrated in FIG. 6B. The lid 30 turns due to the rotation of the rotary shaft 21, and moves and enters between the trap hole 8 and the camera 9, and the trap hole 8 is closed by the lid 30. Then, the SCE measurement is performed in this state. Because the lid 30 has a non-reflective surface characteristic, appropriate SCE measurement in which specular reflection light is excluded can be performed.

When the SCE measurement ends, the rotary shaft 21 of the drive solenoid 20 rotates in the opposite direction, and the lid 30 turns in the opposite direction, by which the trap hole 8 is open as illustrated in FIG. 5A and FIG. 6A.

In this way, because an image of the specimen 100 taken by the camera 9 is displayed on the display panel 3 through the trap hole 8, at a time of measurement, the user can align the measurement opening part 2 with the specimen 100 while checking a position of the specimen by viewing the display panel 3. Thus, positioning with respect to the specimen 100 can be performed quickly and easily, and therefore, it is possible to obtain an appropriate measurement result while improving efficiency of measurement work. Moreover, because a beam splitter for splitting light for the camera 9 is not required, the configuration is simplified accordingly.

In addition, because the trap 11 moves and the trap hole 8 is closed when SCI measurement of light reflected from the specimen 100 is performed, the SCI measurement can be performed appropriately. Meanwhile, because the lid 30 that is non-reflective moves and the trap hole 8 is closed at a time of SCE measurement, specular reflection light is not generated by reflection from the camera 9, and an adverse effect on the measurement can be prevented. As a result, SCI measurement and SCE measurement can be performed by switching therebetween without any problem.

[Second Configuration]

Although a case where the trap 11 and the lid 30 are moved by one drive solenoid 20 is described for the first configuration, in this case, the trap 11 and the lid 30 are driven by separate drive solenoids.

Figure 7:
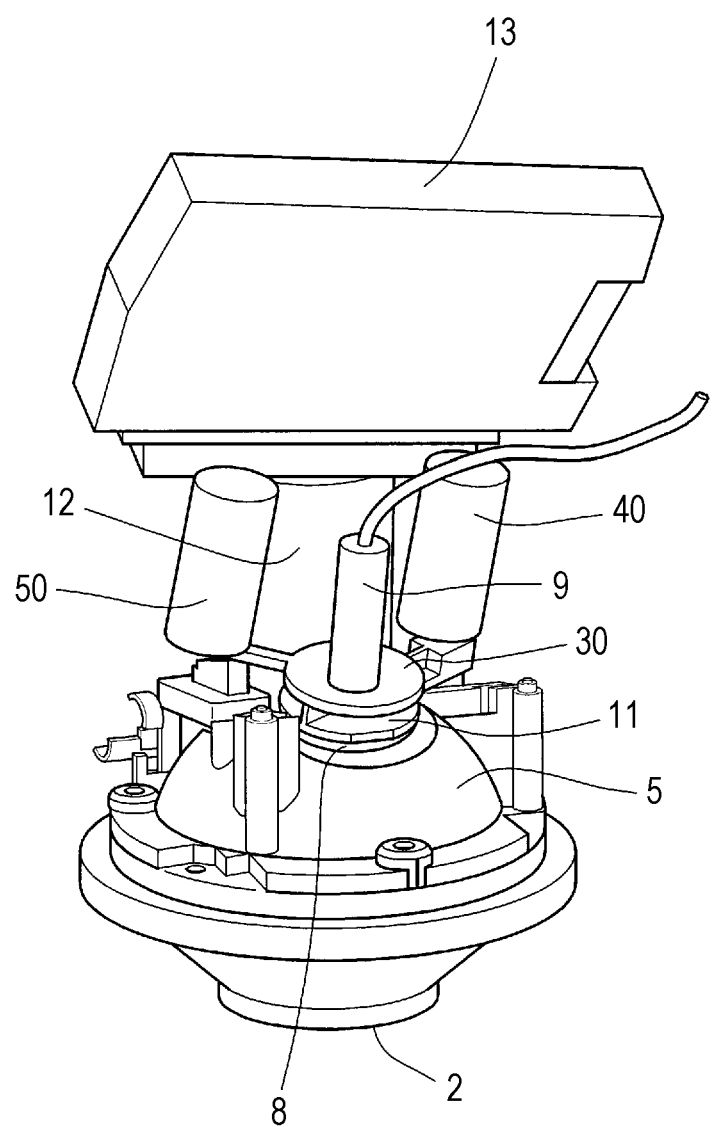
FIG. 7 is a perspective view that illustrates a second configuration example of an inside of the colorimetry device.

That is, as illustrated in FIG. 7, a trap drive solenoid 40 that independently drives the trap 11 and a lid drive solenoid 50 that independently drives the lid 30 are disposed at back on both right and left sides with the trap hole 8 interposed therebetween.

Note that the configuration is the same as the first configuration described above except for configurations related to the trap drive solenoid 40 and the lid drive solenoid 50, and therefore the same components are denoted by the same reference signs, and description thereof will be omitted.

Figure 8A:
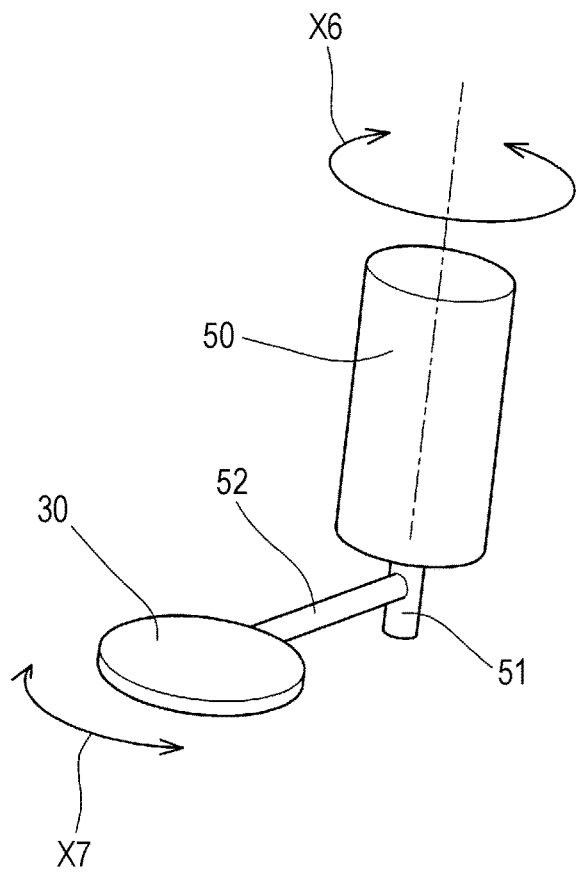
FIG. 8A is a diagram for describing how the lid is coupled to a lid drive solenoid and is driven in a second configuration example.
Figure 8B:
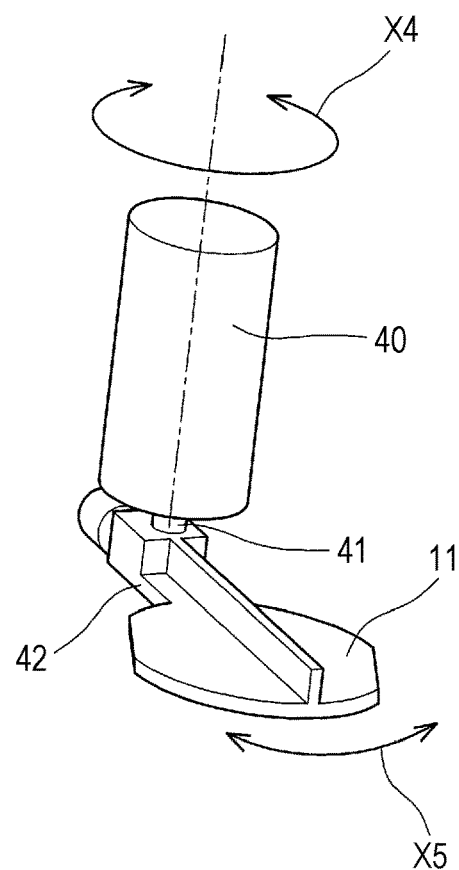
FIG. 8B is a diagram for describing how the trap is coupled to a trap drive solenoid and is driven in the second configuration example.

As illustrated in FIG. 8B, the trap 11 is coupled to a rotary shaft 41 of the trap drive solenoid 40 via a coupling arm 42. Therefore, when the rotary shaft 41 of the trap drive solenoid 40 is rotated in the clockwise direction and the counterclockwise direction as viewed from above as indicated by the arrow x4, the trap 11 also turns in the clockwise direction and the counterclockwise direction via the coupling arm 42 as indicated by the arrow x5, and when turning in the clockwise direction, the trap 11 moves to a position between the trap hole 8 and the camera 9 to close the trap hole 8, and when turned in the counterclockwise direction, the trap 11 moves in a direction away from the trap hole 8 to open the trap hole 8.

Meanwhile, as illustrated in FIG. 8A, the lid 30 is coupled to a rotary shaft 51 of the lid drive solenoid 50 via a coupling arm 52. Therefore, when the rotary shaft of the lid drive solenoid 50 is rotated in the clockwise direction and the counterclockwise direction as viewed from above as indicated by the arrow x6 in FIG. 8A, the lid 30 also turns in the clockwise direction and the counterclockwise direction via the coupling arm 52 as indicated by the arrow x7, and when turning in the counterclockwise direction, the lid 30 moves to a position between the trap hole 8 and the camera 9 to close the trap hole 8, and when turned in the clockwise direction, the lid 30 moves in a direction away from the trap hole 8 to open the trap hole 8.

Next, operation of the colorimetry device 1 illustrated in FIGS. 7 and 8 will be described with reference to FIGS. 9 and 10.

Figure 9A:
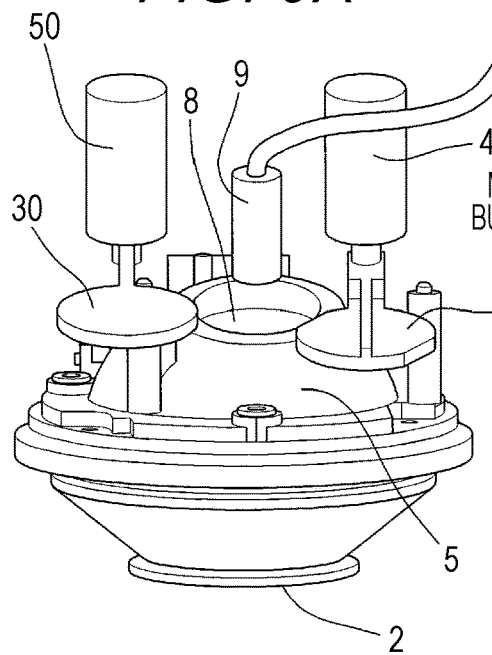
FIG. 9A and FIG. 9B are an explanatory diagram at a time of SCI measurement in the second configuration example.

In a state where an unillustrated power switch is turned on by the user, the trap hole 8 is open, and the camera 9 can take an image of the specimen 100 through the trap hole 8 as illustrated in FIG. 9A.

In a case where SCI measurement is performed, when the user sets an SCI measurement mode, holds the colorimetry device 1, and then aligns the measurement opening part 2 with the specimen 100 as a measurement target, an image of the specimen 100 taken by the camera 9 is displayed on the display panel 3. The user performs alignment of the specimen 100 while checking the image on the display panel 3.

Figure 9B:
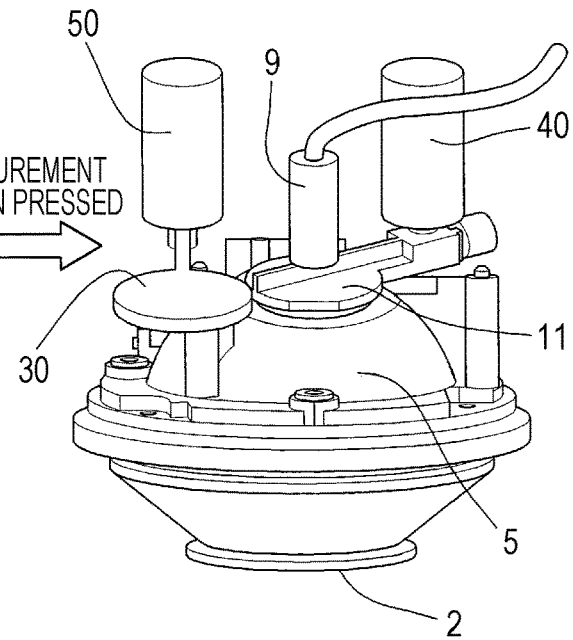

When the user presses the measurement button 4 after the alignment, the trap drive solenoid 40 operates, the rotary shaft 41 rotates and the trap 11 turns, and then the trap hole 8 is closed by the trap 11 as illustrated in FIG. 9B. Then, the SCI measurement is performed in this state. Because the trap hole 8 is closed by the trap 11, appropriate measurement in which specular reflection light is included can be performed.

Figure 10A:
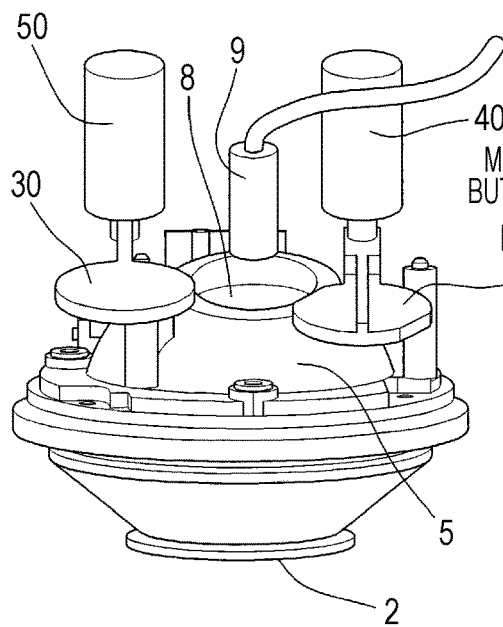
FIG. 10A and FIG. 10B are an explanatory diagram at a time of SCE measurement in the second configuration example.

When the SCI measurement ends, the rotary shaft 41 of the trap drive solenoid 40 rotates in the opposite direction, and the trap 11 turns in the opposite direction, by which the trap hole 8 is open as illustrated in FIG. 10A (same as in FIG. 9A).

Meanwhile, in a case where the user performs SCE measurement, when the user sets an SCE measurement mode, and then aligns the measurement opening part 2 with the specimen 100 as the measurement target, an image of the specimen 100 taken by the camera 9 is displayed on the display panel 3, similarly to a case of the SCI measurement, and therefore, the user performs alignment of the specimen 100 while checking the image on the display panel 3.

Figure 10B:
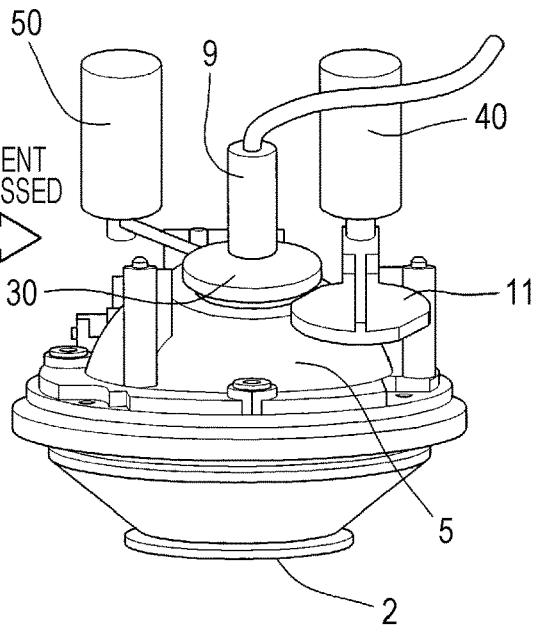

When the user presses the measurement button 4 after the alignment, the lid drive solenoid 50 operates, and the rotary shaft 51 rotates as illustrated in FIG. 10B. The lid 30 turns due to the rotation of the rotary shaft 51, and moves and enters between the trap hole 8 and the camera 9, and the trap hole 8 is closed by the lid 30. Then, the SCE measurement is performed in this state.

When the SCE measurement ends, the rotary shaft 51 of the lid drive solenoid 50 rotates in the opposite direction, and the lid 30 turns in the opposite direction, by which the trap hole 8 is open as illustrated in FIG. 9A and FIG. 10A.

In this way, because an image of the specimen 100 taken by the camera 9 is displayed on the display panel 3 through the trap hole 8 also in this embodiment, at a time of measurement, the user can align the measurement opening part 2 with the specimen 100 while checking a position of the specimen by viewing the display panel 3. Thus, positioning with respect to the specimen 100 can be performed quickly and easily, and therefore, it is possible to obtain an appropriate measurement result while improving efficiency of measurement work. Moreover, because a beam splitter for splitting light for the camera 9 is not required, the configuration is simplified accordingly.

In addition, because the trap 11 moves and the trap hole 8 is closed due to operation of the trap drive solenoid 40 when SCI measurement of light reflected from the specimen 100 is performed, the SCI measurement can be performed appropriately. Meanwhile, because the lid 30 that is non-reflective moves and the trap hole 8 is closed due to operation of the lid drive solenoid 50 at a time of SCE measurement, specular reflection light is not generated by reflection from the camera 9, and an adverse effect on the measurement can be prevented. As a result, SCI measurement and SCE measurement can be performed by switching therebetween without any problem.

In addition, because the trap drive solenoid 40 that independently drives the trap 11 and the lid drive solenoid 50 that independently drives the lid 30 are provided separately, a drive mechanism thereof can be simplified as compared to a case where a trap and a lid are driven by one drive solenoid, although more space is required for installation of the drive solenoids.

[Third Configuration]

Figure 11:
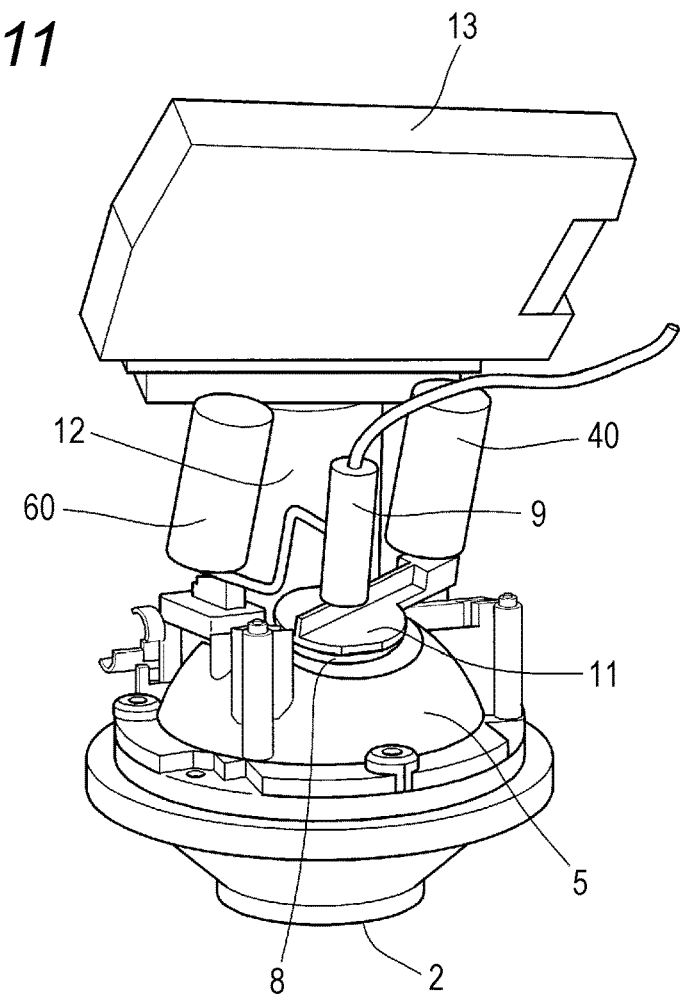
FIG. 11 is a perspective view that illustrates a third configuration example of an inside of the colorimetry device.

In the first configuration and the second configuration, a position of the camera 9 is fixed, and the lid 30 is moved to close the trap hole 8 at a time of SCE measurement. Meanwhile, in this embodiment, the lid 30 is not provided, and at a time of SCE measurement, the camera 9 is retracted from a position facing the trap hole 8 to a side position that does not affect the measurement. That is, as illustrated in FIG. 11, the trap drive solenoid 40 that drives the trap 11 and a camera drive solenoid 60 that moves the camera are disposed at back on both right and left sides with the trap hole 8 interposed therebetween.

Note that the configuration of the trap drive solenoid 40 is the same as the configuration of the trap drive solenoid 40 in the second configuration described above, and the configuration is the same as the first configuration described above except for configurations related to the trap drive solenoid 40 and the camera drive solenoid 60, and therefore the same components are denoted by the same reference signs, and description thereof will be omitted.

Figure 12A:
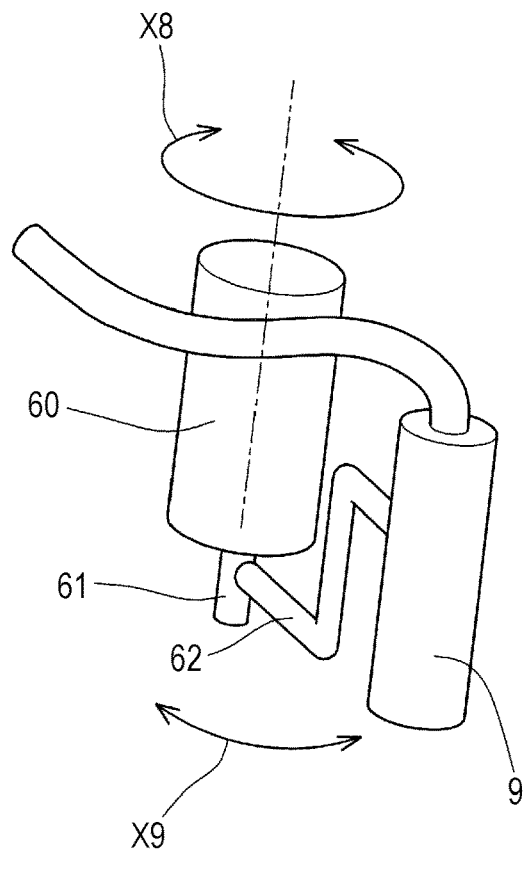
FIG. 12A is a diagram for describing how a camera is coupled to a camera drive solenoid and is driven in the third configuration example.

As illustrated in FIG. 12A, the camera 9 is coupled to a rotary shaft 61 of the camera drive solenoid 60 via a coupling arm 62. Therefore, when the rotary shaft 61 of the camera drive solenoid 60 is rotated in the clockwise direction and the counterclockwise direction as viewed from above as indicated by the arrow x8 in FIG. 12A, the camera 9 also turns in the clockwise direction and the counterclockwise direction via the coupling arm 62 as indicated by the arrow x9, and when turning in the counterclockwise direction, the camera 9 faces the trap hole 8 and can take an image of the specimen 100, and when turned in the clockwise direction, the camera 9 is retracted to a side.

Figure 12B:
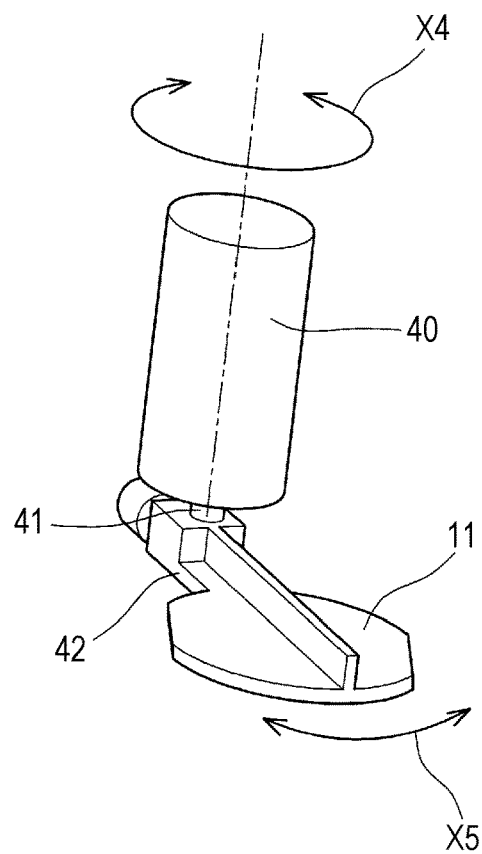
FIG. 12B is a diagram for describing how the trap is coupled to the trap drive solenoid and is driven in the third configuration example.

Next, operation of the colorimetry device 1 illustrated in FIGS. 11 and 12 will be described with reference to FIGS. 13 and 14.

Figure 13A:
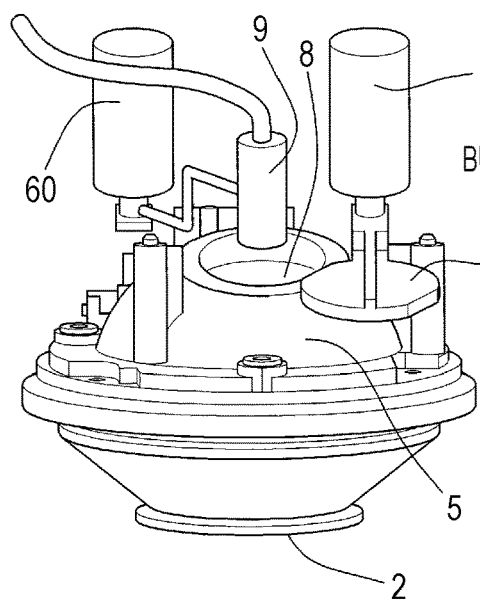
FIG. 13A and FIG. 13B are an explanatory diagram at a time of SCI measurement in the third configuration example.

In a state where an unillustrated power switch is turned on by the user, the trap hole 8 is open, and the camera 9 faces the trap hole 8 and can take an image of the specimen 100 through the trap hole 8 as illustrated in FIG. 13A.

In a case where SCI measurement is performed, when the user sets an SCI measurement mode, holds the colorimetry device 1, and then aligns the measurement opening part 2 with the specimen 100 as a measurement target, an image of the specimen 100 taken by the camera 9 is displayed on the display panel 3. The user performs alignment of the specimen 100 while checking the image on the display panel 3.

Figure 13B:
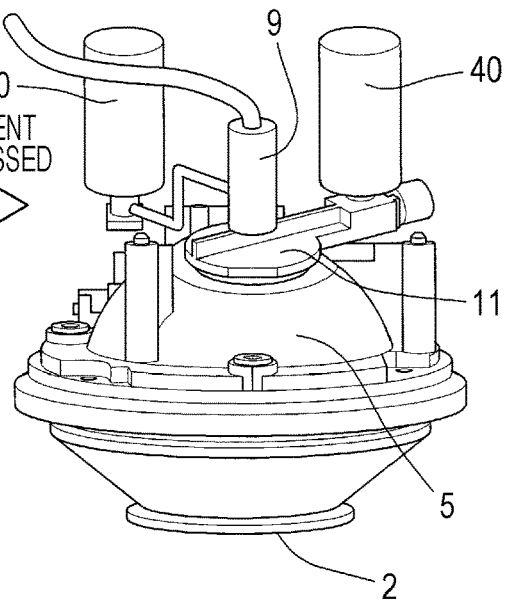

When the user presses the measurement button 4 after the alignment, the trap drive solenoid 40 operates, the rotary shaft 41 rotates and the trap 11 turns, and then the trap hole 8 is closed by the trap 11 as illustrated in FIG. 13B. Then, the SCI measurement is performed in this state. Because the trap hole 8 is closed by the trap 11, appropriate measurement in which specular reflection light is included can be performed.

Figure 14A:
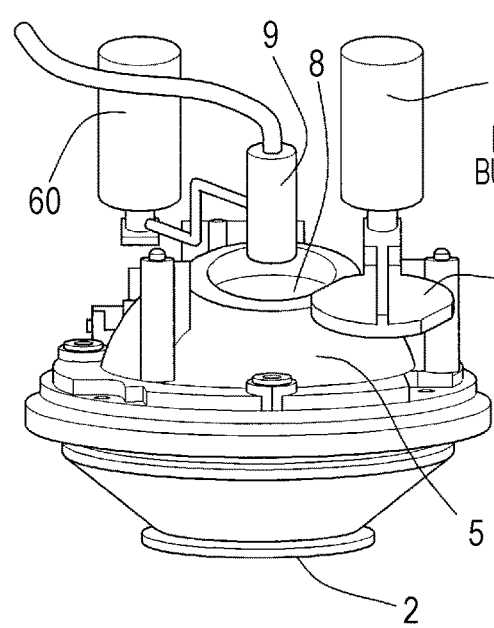
FIG. 14A and FIG. 14B are an explanatory diagram at a time of SCE measurement in the third configuration example.

When the SCI measurement ends, the rotary shaft 41 of the trap drive solenoid 40 rotates in the opposite direction, and the trap 11 turns in the opposite direction, by which the trap hole 8 is open as illustrated in FIG. 14A (same as in FIG. 13A).

Meanwhile, in a case where the user performs SCE measurement, when the user sets an SCE measurement mode, and then aligns the measurement opening part 2 with the specimen 100 as the measurement target, an image of the specimen 100 taken by the camera 9 is displayed on the display panel 3, similarly to a case of the SCI measurement, and therefore, the user performs alignment of the specimen 100 while checking the image on the display panel 3.

Figure 14B:
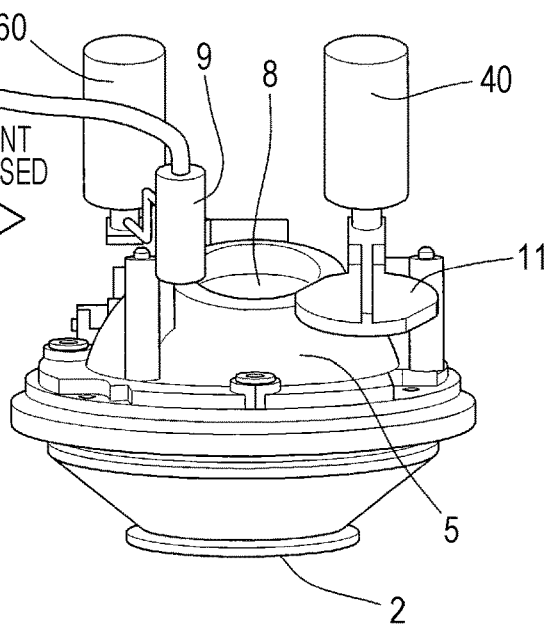

When the user presses the measurement button 4 after the alignment, the camera drive solenoid 60 operates, and the rotary shaft 61 rotates as illustrated in FIG. 14B. Due to the rotation of the rotary shaft 61, the camera 9 turns to the side and is retracted to a position that does not affect the SCE measurement, off the trap hole 8. Then, the SCE measurement is performed in this state.

When the SCE measurement ends, the rotary shaft 61 of the camera drive solenoid 60 rotates in the opposite direction, and the camera 9 turns in the opposite direction, by which the camera 9 faces the trap hole 8 and can take an image of the specimen 100 as illustrated in FIG. 13A and FIG. 14A.

In this way, because an image of the specimen 100 taken by the camera 9 is displayed on the display panel 3 through the trap hole 8 also in this embodiment, at a time of measurement, the user can align the measurement opening part 2 with the specimen while checking a position of the specimen by viewing the display panel 3. Thus, positioning with respect to the specimen 100 can be performed quickly and easily, and therefore, it is possible to obtain an appropriate measurement result while improving efficiency of measurement work. Moreover, because a beam splitter or the like for splitting light for the camera 9 is not required, the configuration is simplified.

In addition, because the trap 11 moves and the trap hole 8 is closed due to operation of the trap drive solenoid 40 when SCI measurement of light reflected from the specimen 100 is performed, the SCI measurement can be performed appropriately. Meanwhile, because the camera 9 moves and is retracted to the side due to operation of the camera drive solenoid 60 at a time of SCE measurement, specular reflection light is not generated by reflection from the camera 9, and an adverse effect on the measurement can be prevented. As a result, SCI measurement and SCE measurement can be performed by switching therebetween without any problem.

INDUSTRIAL APPLICABILITY

The present invention can be utilized when colorimetry is performed by switching between SCI measurement that is reflected light measurement under a condition where specular reflection light from a specimen is included, and SCE measurement that is reflected light measurement under a condition where specular reflection light is excluded.

REFERENCE SIGNS LIST

1 Colorimetry device
2 Measurement opening part
3 Display panel
4 Measurement button
5 Integrating sphere
8 Trap hole
9 Camera (imaging means)
11 Trap 20 Drive solenoid
30 Lid
40 Trap drive solenoid
50 Lid drive solenoid
60 Camera drive solenoid
100 Specimen

The invention claimed is:

1. A colorimetry device comprising:
an integrating sphere having a measurement opening part and a trap hole;
a trap disposed so as to be able to open and close the trap hole;
a lid that is non-reflective and disposed so as to be able to open and close the trap hole;
an imager disposed at a position that allows taking, through the trap hole, an image of a specimen facing the measurement opening part;
a display that displays the image taken by the imager;
a first driver that causes the trap to move to a position at which the trap hole is closed by the trap at a time of measurement of light with an SCI method, the light being reflected from the specimen; and
a second driver that causes the lid to move to a position at which the trap hole is closed by the lid at a time of measurement of light with an SCE method, the light being reflected from the specimen,
wherein the integrating sphere further has a light reception opening, and the colorimetry device further contains a light reception system arranged to receive, through the light reception opening, the light being reflected from the specimen.

2. The colorimetry device according to claim 1, wherein the first driver and the second driver are included in one driver.

3. A colorimetry device comprising:
an integrating sphere having a measurement opening part and a trap hole;
a trap disposed so as to be able to open and close the trap hole;
an imager disposed at a position that allows taking, through the trap hole, an image of a specimen facing the measurement opening part;
a display that displays an image taken by the imager;
a first driver that causes the trap to move to a position at which the trap hole is closed by the trap at a time of measurement of light with an SCI method, the light being reflected from the specimen; and
a third driver that retracts the imager to a position that does not affect measurement at a time of measurement of light with an SCE method, the light being reflected from the specimen.

4. The colorimetry device according to claim 1,
wherein the first driver retracts the trap from the trap hole at a time when the imager takes the image of the specimen, and
the second driver retracts the lid from the trap hole at a time when the imager takes the image of the specimen.

5. The colorimetry device according to claim 4,
wherein the second driver moves the lid to the position at which the trap hole is closed by the lid at the time of measurement with the SCE method, the position being between the imager and the trap hole.

* * * * *